Figure 1:
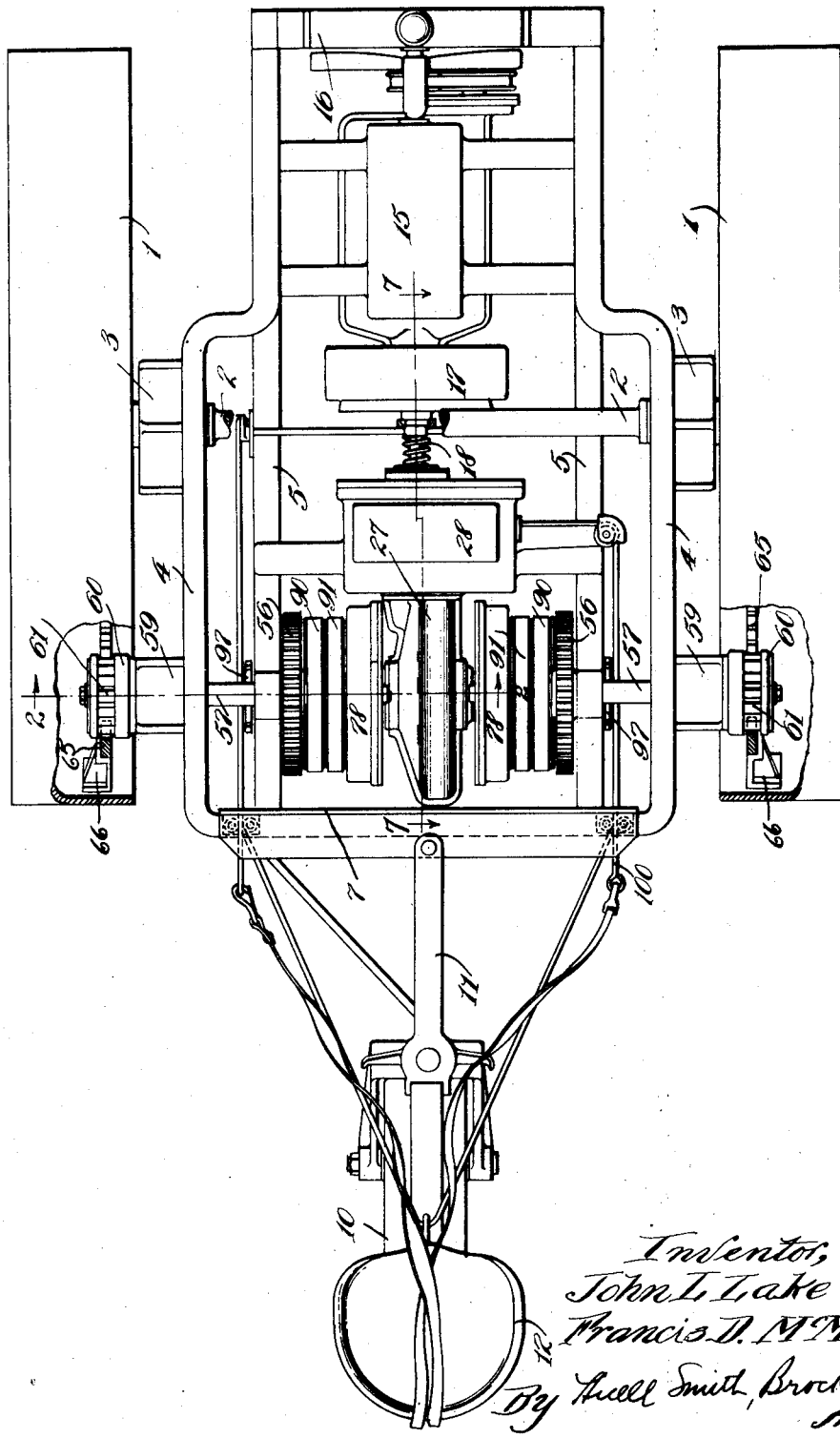

J. L. LAKE AND F. D. McMAHON.
TRACTOR.
APPLICATION FILED AUG. 3, 1917.

1,338,835.

Patented May 4, 1920.
4 SHEETS—SHEET 1.

J. L. LAKE AND F. D. McMAHON.
TRACTOR.
APPLICATION FILED AUG. 3, 1917.

1,338,835. Patented May 4, 1920.
4 SHEETS—SHEET 2.

Inventors,
John L. Lake and
Francis D. McMahon.
By Hull, Smith, Brock & Sted Attys.

J. L. LAKE AND F. D. McMAHON.
TRACTOR.
APPLICATION FILED AUG. 3, 1917.

1,338,835.

Patented May 4, 1920.
4 SHEETS—SHEET 3.

Inventors,
John L. Lake and
Francis D. McMahon.
By Hull, Smith, Brock & Hull
Attys.

J. L. LAKE AND F. D. McMAHON.
TRACTOR.
APPLICATION FILED AUG. 3, 1917.
1,338,835.
Patented May 4, 1920.
4 SHEETS—SHEET 4.
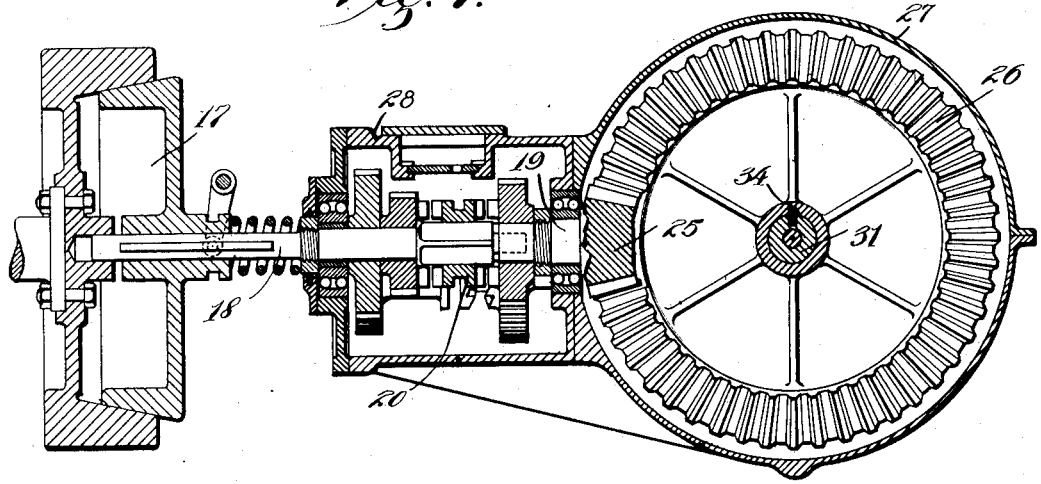
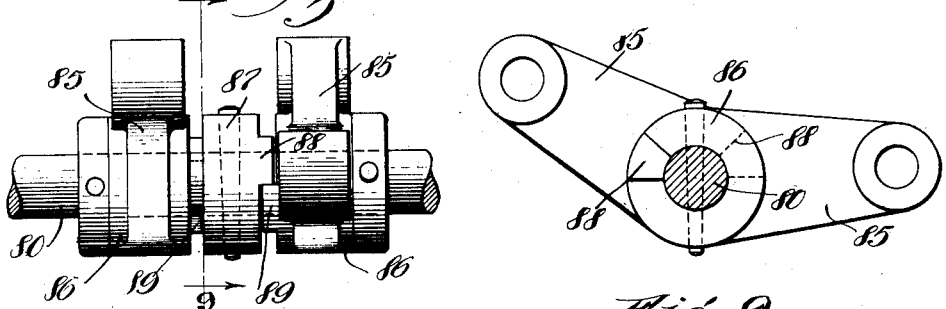
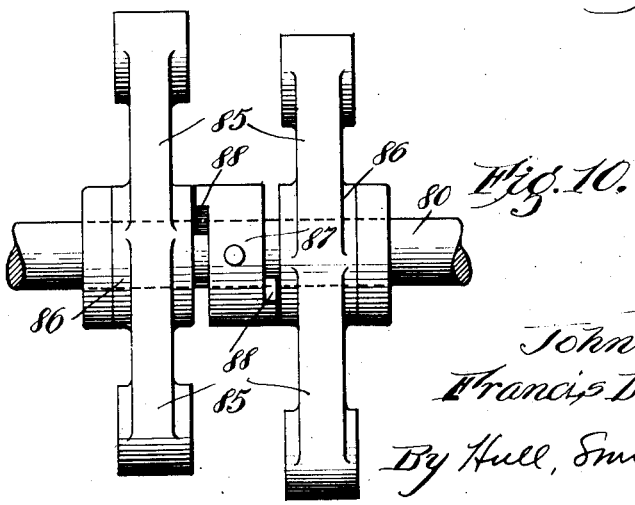
Inventors,
John L. Lake and
Francis D. McMahon
By Hull, Smith Brock & Hull
Attys.

UNITED STATES PATENT OFFICE.

JOHN L. LAKE AND FRANCIS D. McMAHON, OF CLEVELAND, OHIO.

TRACTOR.

1,338,835.  Specification of Letters Patent.  Patented May 4, 1920.

Application filed August. 3, 1917. Serial No. 184,213.

*To all whom it may concern:*

Be it known that we, JOHN L. LAKE, a subject of the King of Great Britain, and a citizen of the Dominion of Canada, and FRANCIS D. McMAHON, a citizen of the United States, both residing at Cleveland, in the county of Cuyahoga and State of Ohio, have invented a certain new and useful Improvement in Tractors, of which the following is a full, clear, and exact description, reference being had to the accompanying drawings.

This invention relates to tractors, especially of the "line-drive" type, an example of which is shown in our prior application filed June 14, 1917, Serial No. 174,686; and the invention has to do more particularly with a simplified control mechanism through which each of the opposed traction elements or wheels may be driven forwardly or rearwardly at various speeds and under the control of a single line.

The primary object of our present invention is to provide an arrangement whereby a tractor of the aforesaid character may be controlled as nearly as possible like driving a horse or a team of horses as, by relaxing the lines the tractor will move forwardly; by slightly drawing in on the lines, the speed will be slackened; by pulling further upon the lines (to neutral position where the line controlled mechanism may be held by suitable means) the tractor will stop; by pulling still further upon the lines the tractor may be caused to back, the speed depending upon the degree of power exerted upon the lines until the maximum speed is attained; and by pulling upon the right or left hand line, while the other is relaxed, the tractor will be caused to turn, respectively, to the right or left.

These results, in a general way, are attained in the tractor shown in the above mentioned application, as well as in other tractors which are now in use; but in our present tractor the results are accomplished with greater ease and more positively and in a more natural manner, especially to those accustomed to driving horses, than in any machine with which we are acquainted.

To the ends above related, we interpose a planetary gear set between the central driving mechanism and each of the traction elements involving two brake drums, one of which represents the forward drive of the corresponding traction element, and the other the reverse drive, and we employ a common actuating means for the brake bands of the two drums of each planetary gear set which is moved in one direction preferably by a line (to apply the brake band to the "reverse" drum) and in the opposite direction by a spring or its equivalent (to apply the other brake band to the "forward" drum); and we include a device for maintaining the actuating means in neutral condition, when neither brake band is applied, which is preferably rendered effective by a spring and ineffective by a pull upon the line. The combination of the foregoing elements, therefore, constitute the present embodiment of our invention, and while we shall proceed to describe them in detail and according to the arrangement illustrated in the accompanying drawings we wish to be understood as not limiting ourselves to such structural details and arrangements further than is required by the terms of the annexed claims.

Figure 2:
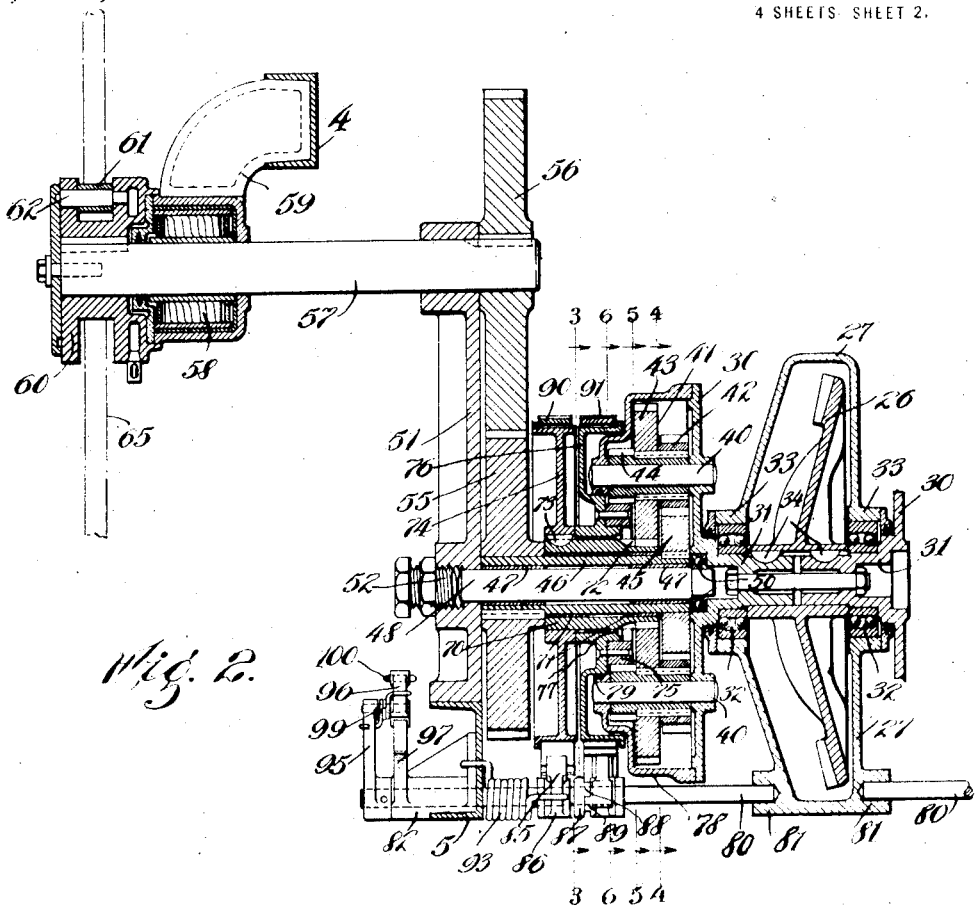
Figure 3:
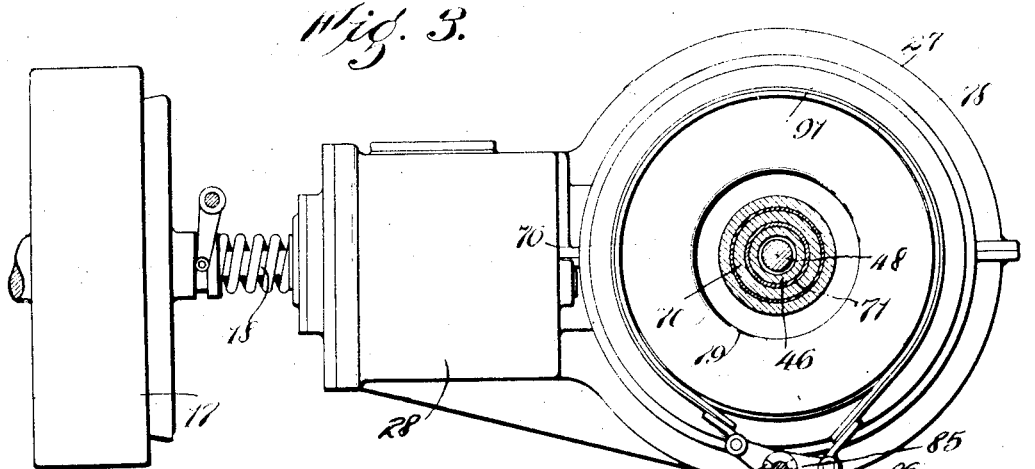
Figure 4:
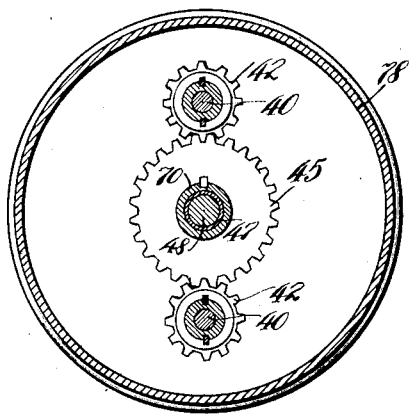
Figure 5:
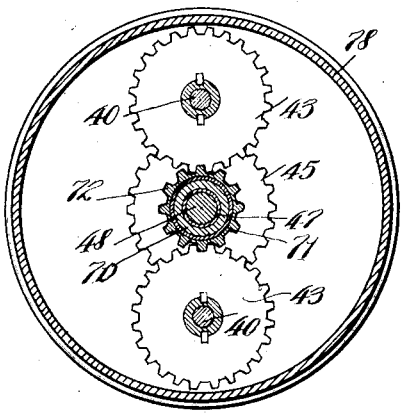
Figure 6:
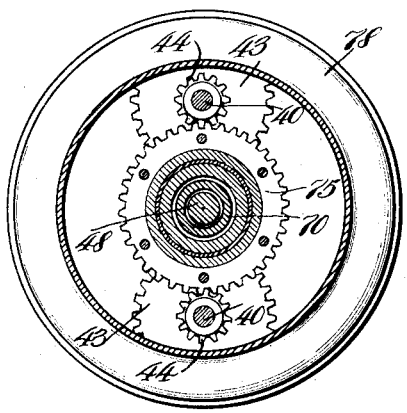
Figure 11:
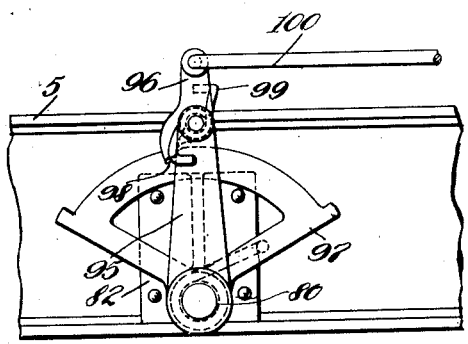

In the drawings, Figure 1 is a plan view of a tractor embodying our invention; Fig. 2 is an enlarged sectional detail on the line 2—2 of Fig. 1; Fig. 3 is a section on the line 3—3 of Fig. 2; Figs. 4, 5, and 6 are sections on the respective correspondingly numbered lines of Fig. 2; Fig. 7 is a central longitudinal section on the line 7—7 of Fig. 1; Figs. 8, 9, and 10 are, respectively, a rear elevation, a sectional detail, and a plan of the brake band actuating means, Fig. 9 being a section on the line 9—9 of Fig. 8; and Fig. 11 is a detail of the line controlled lever for rocking the shaft through which the brake actuating means shown in Figs. 8 to 10 is operated.

In general, the apparatus comprises the traction elements or wheels 1 which are loosely mounted upon the ends of an axle 2, and the frame of the machine is suspended, through suitable yielding connections represented generally at 3, from the axle and is made up of an upper frame section 4, and a lower frame section 5, the latter being of the same width throughout its length, while the former is widened forward of the axle where it extends, throughout the remainder of its length toward the rear, in rather close proximity to the adjacent traction element. The upper and lower frame sections are rigidly connected through suitable lacing members 6, and at their rear ends are shown as further connected together by a plate 7.

When the tractor is not coupled to a trailer of some sort, such as a wagon, plow, or other implement, the rear end of the frame is retained at the desired elevation by a caster 10 that is adapted to be connected through a frame 11, to the rear end of the tractor, and a seat 12 for the driver is shown as supported by the frame 11.

A motor 15 is supported in the forward end of the tractor frame, and in the present instance the same is shown conventionally as an internal combustion engine which, it may be stated, is preferably governor controlled, as is usual in tractors of this type. The water jacket of the engine has communicative connection with a radiator 16 that is supported by the extreme forward end of the frame. Following the usual practice of motor propelled vehicles the motor shaft is adapted to be connected, through a clutch 17, with a shaft 18, and this shaft, in turn, is adapted to have driving connection with a shaft 19 through suitable change-of-speed gearing that is designated 20, the present change-of-speed gearing being substantially the same as that shown in the application already referred to. The shaft 19 carries a bevel pinion 25 which meshes with a corresponding gear 26, and this gear, and the change-of-speed gearing 20, are housed respectively in suitable casings to which the numerals 27 and 28 are applied, and which are supported by the tractor frame.

Opposed driving heads 30 have their hub extensions 31 journaled within anti-friction bearings 32 that are contained within the bosses 33, occurring on opposite sides of the casing 27, and the inner ends of the hub extensions of these driving heads have secured to them, as by keys 34, the hub of the gear 26. Accordingly the driving heads 30 are driven with the gear 26.

The driving connection between each of the driving heads 30 and the traction element occurring on the same side of the machine are identical on both sides, so that a detail description of one will suffice for both. The description is made with particular reference to Fig. 2. Each driving head 30 constitutes that element of a planetary gear set which carries the arbors 40 whereon the planet-gears 41 freely rotate. While each planet-gear 41 is made up of three separate parts, for manufacturing purposes, and is so shown herein, for convenience it may be regarded as one integral unit having the three gear faces 42, 43, and 44. The gear-faces 42 of the planet-gears mesh with a gear 45 that is keyed to the inner end of a sleeve 46. This sleeve bears, through suitable bushings 47, upon a spindle 48, which has its inner end piloted within the hub 31 of the driving head, with a suitable thrust bearing 50 interposed, while its outer end is supported in a housing 51, rising from the lower frame section 5. For the purpose of adjustment of the thrust bearings 50, we provide a set screw 52 which is threaded into the outer end of the bore containing the spindle, and which screw bears upon the end of the spindle. The sleeve 46 has keyed to its outer end a gear 55 which meshes with a gear 56 that is secured to the inner end of what we shall call, according to the usage of the term in the art, a bull-pinion shaft 57. Just outside the gear 56 this shaft is journaled within a bearing formed in the upper end of the housing 51, and near its outer end the shaft is supported within a suitable anti-friction roller bearing 58 that is carried by a bracket 59 secured to and extending outwardly and downwardly from the upper frame section 4. Outside the bracket 59 a bull-pinion 60 is keyed to the shaft 57, the same comprising, besides a hub portion, opposed flanges between which rollers 61 are journaled upon pins 62 that have their ends supported within the flanges. Each bull-pinion meshes with an internal bull-gear 65 that is secured, through brackets 66, to the inner face of the corresponding traction element or wheel 1. Thus it will be seen that the former pinion 45, on the inner end of the sleeve 46, has positive driving connection with the traction element on the corresponding side of the machine.

Returning to the planetary gear set:—70 is a sleeve that is rotatably supported, through bushings 71, upon the former sleeve 46, and the inner end of the sleeve 70 is provided with a circumferential set of gear teeth, indicated at 72, wherewith the gear-faces 43 of the planet-gears are arranged to mesh. The outer end of the sleeve 70 has secured to it, by means of a key 73, a brake drum 74. The third, or remaining, faces of the planet-gears engage with the teeth formed on the outer periphery of a ring 75 which is shown as secured, by rivets, to the spider of a brake drum 76 which has its hub journaled, through a bushing 77, on the sleeve 70. A casing member 78 is connected to each driving head 30 and extends out over and incloses the planet-gears carried by such head and has its smaller end bearing upon a shoulder 79 of the spider of the adjacent brake drum 76, where it is provided with a suitable packing ring to prevent the entrance of dust or dirt, or the escape of oil or other lubricant.

A rock shaft 80 is shown as supported beneath each of the planetary gear sets by having its inner end journaled within a boss 81 of the casing 27 and its outer end portion supported within a bearing 82, carried by the lower frame section 5. A double arm 85 has its hub portion 86 loosely journaled upon the rock shaft 80 beneath each of the brake drums 74 and 76, and intermediate the arms, an actuating member 87 is pinned to the rock shaft. The opposed faces of the actuating member have lateral lugs 88 which are arranged to coöperate with corresponding lugs 89 on the adjacent annular faces of the hubs of the arms 85. A brake band 90 encircles the drum 74 and has its ends connected to the opposite ends of the double arm located below this drum, and a brake band 91 encircles the brake drum 76 and has its ends likewise attached to the opposite ends of the other arm 85. When the parts are in neutral condition with the brake bands relaxed, the lugs of the actuating element 87 exert no pressure upon the lugs of either of the arms 85; but when the shaft 80 is rocked over and forwardly, the actuating element swings the arm 85 connected to the brake band 90, to apply the band forcibly to the brake drum, while the other band remains lax. These conditions are reversed and the brake band 91 is applied while the brake band 90 is released when the shaft 80 is turned over toward the rear. We prefer to employ a spring for rocking the shaft 80 in a direction to apply the band 90, and in the present instance the spring, shown at 93, is coiled about the shaft and has one of its ends secured to the shaft, while its opposite end is attached to a fixed part of the machine. This spring is of sufficient strength to apply the band 90 to the brake drum 74 with enough force to hold the drum tight while the machine is being driven, a necessity which will appear from the description of the operation of the mechanism hereinafter to be made.

A lever 95 is secured to the outer end of each shaft 80, and a dog 96 is pivoted to its upper end. The nose of the dog is adapted to ride along the arcuate edge of a sector 97 that is secured to the frame of the machine, or to be projected into a notch 98 of the sector by a spring 99 which is coiled about the pivot of the dog and has one of its ends bearing upon the dog and its opposite end upon the lever 95. A line 100 is connected to the dog, and by means of this line the dog may be rocked upon its pivot against the tension of the spring 99 to withdraw its nose from the notch 98, and the lever 95 may be swung to rock the shaft 80 in opposition to the spring 93, or to allow said spring to rotate the shaft under the constant control of the line. The lines 100 are led rearwardly where they may be within convenient reach of an operator occupying the seat 12, or seated upon a wagon or implement coupled to the tractor.

The operation of the planetary gear sets is as follows: The driving heads 30, while rotating, carry the arbors 40 about an orbit concentric with the sleeve 46. The gear faces 42, 43 and 44 of the planet-gears 41 constantly mesh, respectively, with the gear 47, the teeth 72 of the sleeve 70 that is fixed with respect to the brake drum 74, and the teeth of the ring 75 that is carried by the brake drum 76. Inasmuch as the forward drive of the traction element is accomplished through the drum 74, this drum will be referred to as the "forward" drum, and the other, for a similar reason, as the "reverse" drum. For convenience of description, and by reason of their functions, the tooth portion of the sleeve 70, and the ring 75, will be referred to, respectively, as the "forward" and "reverse" tracks. Now as each driving head 30 rotates, the planet gears 41 will race about the gear 45 and the tracks 72 and 75, turning the tracks idly at speeds dependent upon the ratio of the tracks and their coöperating gears, it being remembered that the gear 45 has positive connection with the traction element, wherefore it will remain quiet. Now by pulling upon the line 100 to disengage the nose of the dog 96 from the notch 98 and thereafter gradually releasing the line, the spring 93 will be permitted to rock the shaft 80 over and forwardly to apply the brake band 90 to the drum 74, thus retarding or stopping the rotation of the drum and consequently the rotation of the track 72. The track, now becoming stationary and refusing to receive motion from the planet-gears, the planet-gears are compelled to rotate at a given speed with respect to the track, and this same positive drive is transmitted through the gear faces 42 of the planet-gears to the gear 45 and ultimately to the traction element through the connections already described. It may be explained that the ratio of the gear faces 42 and 43 of the planet gears, to the gear and track wherewith they mesh is such as will cause the gear 45 to be driven at a speed slightly less than that of the driving head 30 and in the same direction. Now, upon pulling backward on the line 100 and rocking the shaft 80 over and to the rear, the brake band 90 will be released from its drum, and the brake band 91 applied with force thereby to retard or stop the rotation of this drum and consequently the track 75. With the track 75 stationary and the former track 72 released, the planet-gears are compelled to rotate at a speed depending upon the ratio of their gear faces 44 to the track 75, and this speed is sufficient to rotate the gear 45 in a reverse direction and at a speed (in the present instance) slightly less than the forward speed of the gear 45, notwithstanding the continued rotation of the head 30 in the same direction as before. When it is desired to return the shaft 80 to neutral position with both brake bands relaxed, it is only necessary to release the line 100 abruptly while the lever 95 is somewhat to the rear of its central position so that the dog 96 may be oscillated by its spring 99 to engage its nose within the notch 98 before the arm has time to swing the dog beyond such notch.

From the foregoing it will be seen that our present invention provides a very simple and convenient, yet highly efficient control for tractors of the sort herein referred to, and that, considering the flexibility of the control, its positiveness, etc., the invention provides a very simple mechanism for attaining the desired end.

Having thus described our invention, what we claim is:—

1. A planetary gear set designed to transmit power from the driving mechanism to the traction element of a tractor, and including a pair of drums, one of said drums, through being held against free rotation, will cause the traction element to be driven forwardly, and the other of which through being similarly held, will cause the traction element to be driven rearwardly, a brake element for coöperation with each drum, a rock shaft, an actuating member carried by the shaft and arranged for operative connection with one of the brake elements when the shaft is rotated in one direction and with the other brake element when the shaft is rotated in the reverse direction, means tending to rock the shaft in one direction, an arm secured to the shaft, and a line secured to the arm for swinging it to rock the shaft against the action of the aforesaid means.

2. A planetary gear set designed to transmit power from the driving mechanism to the traction element of a tractor, and including a pair of drums, one of said drums, through being held against free rotation, will cause the traction element to be driven forwardly, and the other of which through being similarly held, will cause the traction element to be driven rearwardly, a brake element for coöperation with each drum, an actuating member arranged for operative connection with one of the brake elements when moved in one direction and with the other brake element when moved in a reverse direction for causing either element to hold its respective drum with any desired degree of positiveness, means tending to move the member in one direction, an arm operatively connected to the member, a dog carried by the arm, a retaining element for engagement by the dog to hold the arm in neutral position, and a line connected to the dog and through which the dog may be rendered ineffective and the swinging of the arm in either direction from its neutral position may be controlled.

3. A planetary gear set designed to transmit power from the driving mechanism to the traction element of a tractor, and involving two members one of which, through being held against free movement, will result in the traction element being driven forwardly, and the other, through being similarly held, will result in the traction element being driven rearwardly, a device movable in one direction to hold one of said members with any desired degree of positiveness and in the opposite direction to similarly hold the other, means tending to move the device in one direction, means for moving the device in the other direction, and mechanism controlled by the last mentioned means for maintaining the device in neutral position.

4. A planetary gear set designed for use with tractors to transmit power from the driving mechanism to the traction element and comprising a driving head arranged to be driven by the driving mechanism, a triple face planet-gear carried by the driving head, the radius of the various gear faces of which differ from each other, a gear adapted to have positive driving connection with the traction element and wherewith the gear faces of a radius intermediate the radii of the other faces coöperates, a track-gear wherewith each of the other gear faces of the planet-gear coöperates, a brake drum rigidly connected to each track-gear, brake mechanism for coöperation with said brake drums and through which said brake drums may be controlled, a casing carried by the driving head and inclosing the planet-gear and having a portion forming a closed joint with a portion of one of the brake drums, and means controlling the rotation of the brake drums.

5. A planetary gear set designed for use with tractors to transmit power from the driving mechanism to the traction element and comprising a driving head in the form of a casing member having opposed walls, arbors having their ends supported within the opposed walls, triple face planet-gears journaled upon said arbors, a gear coöperating with one face of the planet-gears and arranged to have positive driving connection with the traction element, a pair of brake drums having extensions projecting into the casing, said extensions being provided with gear teeth for coöperation with the other faces of the planet-gears and one of said brake drums having a portion wherewith the portion of the casing coöperates to form a joint, and brake mechanism through which the brake drums may be controlled.

6. A planetary gear set designed for use with tractors to transmit power from the driving mechanism to the traction element and comprising a driving head in the form of a casing member having opposed walls, arbors having their ends supported within the opposed walls, triple face planet-gears journaled upon said arbors, a gear coöperating with one face of the planet-gears and arranged to have positive driving connection with the traction element, a pair of brake members having extensions projecting into the casing, said extensions being provided with gear teeth for coöperation with the other faces of the planet-gears, and brake mechanism through which the brake members may be controlled.

7. The combination of opposite traction elements, a motor, a planetary gear set between the motor and each element, a pair of driving lines, and means actuated by each line to operatively control each gear set with varying degrees of positiveness in either direct or reverse direction to drive each element either forwardly or backwardly.

8. The combination of opposite traction elements, a motor, a planetary gear set between the motor and each element and including two members one of which through being held against free movement will cause the traction element to be driven forwardly and the other through being similarly held will cause the traction element to be driven rearwardly, means associated with each planetary gear set and movable in one direction for holding one of the aforesaid members of said set with any desired degree of positiveness and movable in the opposite direction for holding the other member of said set in a similar manner, a device tending to move said means of each set in one direction, and a pair of driving reins connected to said means of the two planetary gear sets for moving them in opposition to the aforesaid devices.

In testimony whereof, we hereunto affix our signatures.

JOHN L. LAKE.
FRANCIS D. McMAHON.